(12) United States Patent
Sasama

(10) Patent No.: US 6,573,680 B2
(45) Date of Patent: Jun. 3, 2003

(54) METHOD AND CIRCUIT FOR DRIVING STEPPING MOTOR

(75) Inventor: Kazuo Sasama, Kawasaki (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/922,707

(22) Filed: Aug. 7, 2001

(65) Prior Publication Data

US 2003/0030403 A1 Feb. 13, 2003

(51) Int. Cl.[7] .................................................. H02P 8/00
(52) U.S. Cl. ........................ 318/696; 318/685; 318/439
(58) Field of Search ................................. 318/138, 254, 318/439, 599, 567, 569, 600, 798–815, 685, 696; 388/804, 819, 829, 831

(56) References Cited

U.S. PATENT DOCUMENTS 5,483,141 A * 1/1996 Uesugi ........................ 318/811
5,625,269 A * 4/1997 Ikeda .......................... 318/696
6,054,835 A * 4/2000 Thiemann et al. ........... 318/685

FOREIGN PATENT DOCUMENTS

JP          9-219995         8/1997

* cited by examiner

*Primary Examiner*—Khanh Dang
(74) *Attorney, Agent, or Firm*—Foley & Lardner

(57) ABSTRACT

A method for driving a stepping motor which performs a micro step driving of the present invention makes a rise through rate variable by matching a step difference related to a change in a value of current when a value of current caused to flow in the stepping motor is increased, and makes a fall through rate variable by matching a step difference related to a change in a value of current when the value of current caused to flow in the stepping motor is decreased. Particularly, at a point of the change of increase/decrease of the value of current caused to flow in the stepping motor, the rise through rate and the fall through rate matched with the step difference related to the change in the value of current are set, and when the value of current let flow in the stepping motor became a constant value, the rise through rate and the fall through rate are made small.

14 Claims, 10 Drawing Sheets

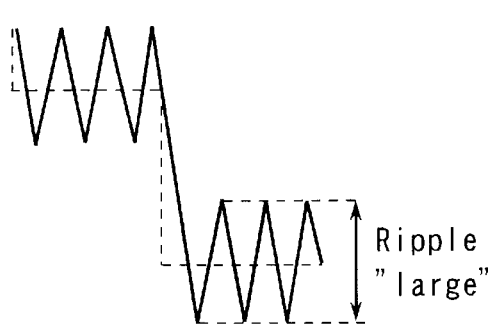
FIG. 5
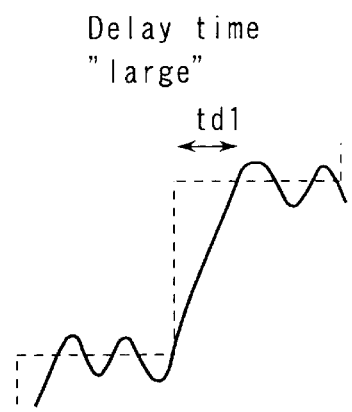
FIG. 6
FIG. 7
FIG. 8
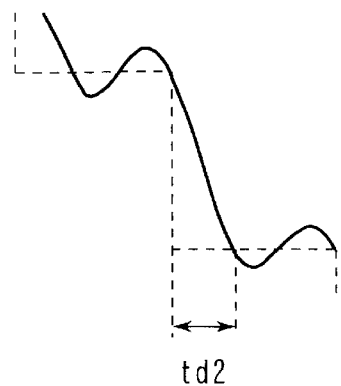
FIG. 9

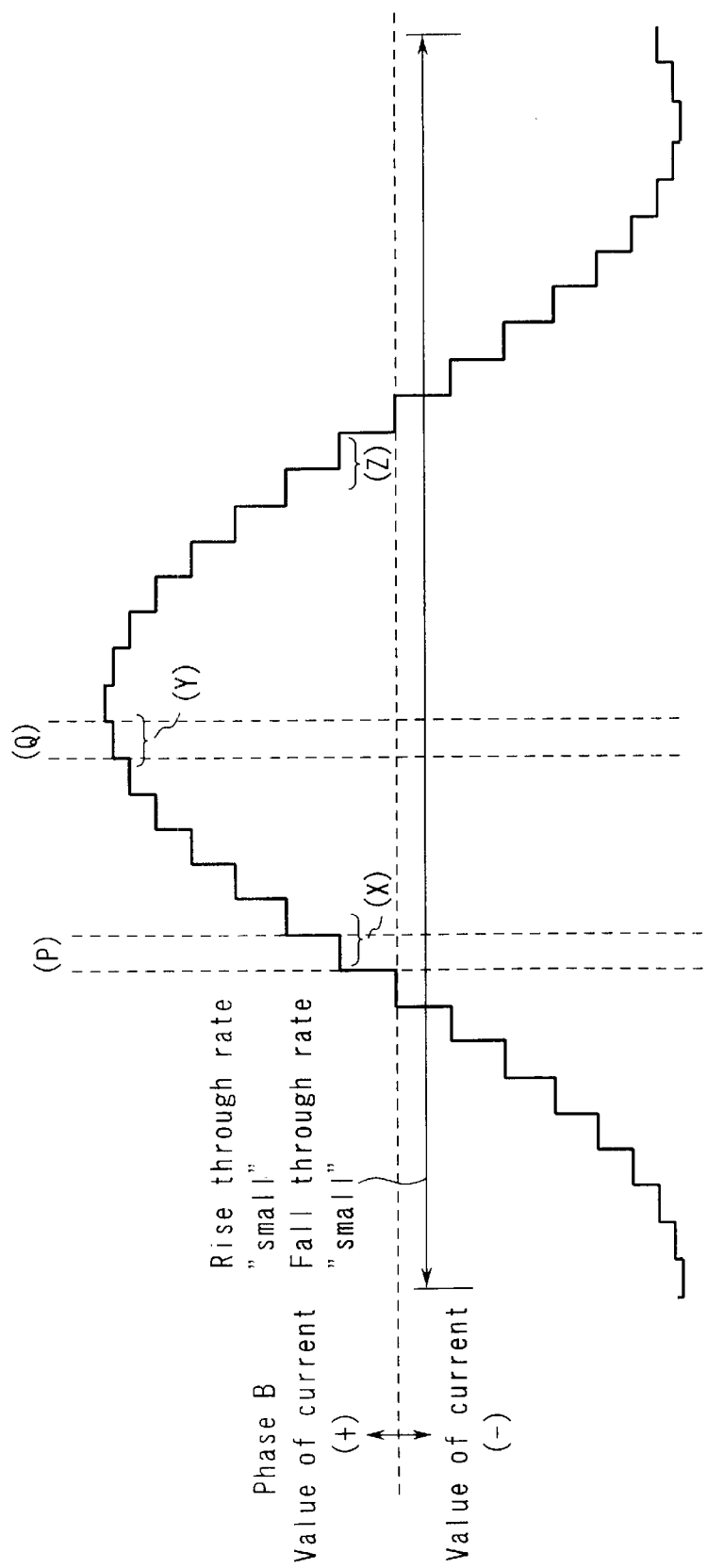

Lm : Inductor of motor windings

METHOD AND CIRCUIT FOR DRIVING STEPPING MOTOR

BACKGROUND OF THE INVENTION

The present invention relates to a driving method and a driving circuit for a stepping motor which drives a carriage and the like of a scanner, for example, in an image forming apparatus and the like.

In general, for example, in the driving method for a stepping motor which drives a carriage and the like of a scanner, for example, a micro step driving is performed. That is, by adopting the micro step driving, the number of partitions is increased or decreased in relation to the vibration generated in a low velocity area of the stepping motor, thereby allowing a peak current value to be variable and decreasing the vibration.

Now, in FIG. 1, an ideal value of a phase current waveform (assumed to be of ⅛ partition herein) in the micro step driving is shown, and it will be described below.

In general, regarding a current control, a chopping system is adopted, in which an ON state for causing current to flow for a target current value and an OFF state for not causing current to flow are controlled by a higher frequency (20 to 50 KHz) than a motor driving frequency.

In the current control by this chopping system, a rise through rate and a fall through rate of a motor driver are constant.

Hence, according to characteristics of the rise through rate and the fall through rate of stepwise waveforms as shown in FIG. 1, the rise through rate and the fall through rate are controlled by current waveforms as shown in FIGS. 2 to 9. That is, FIG. 2 shows a waveform when a current waveform at a point (X) of FIG. 1 is controlled by the rise through rate "large" and the fall through rate "large". FIG. 3 shows a waveform when a current waveform at a point (Y) of FIG. 1 is controlled by the rise through rate "large" and the fall through rate "large".

Also, FIG. 4 shows a waveform when a current waveform at a point (W) of FIG. 1 is controlled by the rise through rate "large" and the fall through rate "large". FIG. 5 shows a waveform, in which a current waveform at a point (Z) of FIG. 1 is controlled by the rise through rate "large" and the fall through rate "large"

In the current waveforms shown in these FIGS. 2 to 5, since the rise through rate is "large", the rise of current is quick. Hence, an overshoot and an undershoot are generated largely so as to make a ripple of the current large.

Particularly, as evident from FIGS. 3 and 4, when a step difference of the current is small, the ripple of the current becomes larger than the step difference of the current and is not controlled correctly to the stepwise waveforms (Y) and (W). Also, as shown in FIGS. 2 and 5, when the step difference of the current is large, since the ripple of the current is smaller than the step difference of the current, it relatively comes closer to the stepwise waveform. However, the current ripple does not differ from FIGS. 3 and 4. The current being unable to be controlled to the correct stepwise waveforms due to the influence of the ripple of the current is a cause of generating vibration without being able to correctly control the rotation of the motor.

On the other hand, FIG. 6 shows a waveform when the current waveform at the point (X) of FIG. 1 is controlled by the rise through rate "small" and the fall through rate "small". FIG. 7 shows a waveform when the current waveform at the point (Y) is controlled by the rise through rate "small" and the fall through rate "small".

Also, FIG. 8 shows a waveform when the current waveform at the point (W) is controlled by the rise through rate "small" and the fall through rate "small". FIG. 9 shows a waveform when the current waveform at the point (Z) is controlled by the rise through rate "small" and the fall through rate "small".

In FIG. 6, since the step difference of the current is large and the rise through rate is "small", the rise of the current is delayed and takes a delay time of td1 and does not follow the current waveform (X) of FIG. 1. In FIG. 9, since the step difference of the current is large and the fall through rate is "small", the fall of the current is delayed and takes a delay time of td2 and does not follow the current waveform (Z) of FIG. 1. The generating of the delayed time in such a manner means that the control of the motor is delayed. The current being unable to be controlled to the correct stepwise waveforms due to the influence of the delay time of the current is a cause of generating vibration without being able to correctly control the rotation of the motor.

In FIGS. 7 and 8, since the step difference of the current is small, even if the through rate is small, the waveform follows stepwise thereby it is possible to control the current. Also, since the rise through rate or the fall through rate is small, the ripple is also made small.

In this way, in the method for driving a stepping motor according to the prior art, since it is a control method by allowing the rise through rate and the fall through rate of the current to be constant, even if a waveform can be controlled in a part of the stepwise waveforms, in other parts thereof, a large ripple or a large delay time in a follow-up property of the current control has been generated. Thus, it is not possible to control the waveform to a correct stepwise waveform and the generation of the vibration has been caused.

Now, in FIGS. 10A and 10B, a relationship between a phase A and a phase B in the case where a relationship between a micro step driving current waveform and a drive through rate is used in the conventional rise through rate "large" and the fall through rate "large" is shown, and it will be described below.

The driving current waveform of the phase A at a point (P) of FIG. 10A denotes FIG. 4. The driving current waveform of the phase B at a point (P) of FIG. 10B denotes FIG. 2.

At a point (X) of the phase B, the current ripple is "large" and yet it follows the stepwise waveform. However, at a point (W) of the phase A, since the ripple is large, it is unable to follow the stepwise waveform. This shows that, at a point (W) of the phase B, a rotational angle can maintain a position, but at a point (X) of the phase A, the rotational angle cannot maintain the position. In the micro step driving of the stepping motor, the rotational angle is controlled by a value of current caused to flow to the phase A and the phase B. However, at the point (P), the angle position of the phase A fluctuates and therefore it shows that the angle position of the stepping motor fluctuates. The generating of the fluctuation of the rotational angle shows that the vibration is generated in the stepping motor.

The driving current waveform of the phase A at a point (Q) of FIG. 10A denotes FIG. 5. The driving current waveform of the phase B at a point (Q) of FIG. 10B denotes FIG. 3.

At a point (Z) of the phase A, the current ripple is "large" and yet it follows the stepwise waveform. However, at a point (Y) of the phase B, since the ripple is large, it is unable to follow the stepwise waveform. This shows that, at a point (Z) of the phase A, the rotational angel can maintain the position, but at a point (Y) of the phase B, the rotational angle cannot maintain the position. Due to the same reason as the fluctuation of the rotational angle at the point (P), at the point (Q) also, the rotational angle fluctuates and the vibration is generated in the stepping motor.

On the other hand, in FIGS. 11A and 11B, the relationship between the phase A and the phase B in the case where the relationship between the micro step driving current waveform and the drive through rate is used in the conventional rise through rate "small" and the fall through rate "small" is shown, and it will be described below.

The driving current waveform of the phase A at a point (P) of FIG. 11A denotes FIG. 8. The driving current waveform of the phase B at a point (P) of FIG. 11B denotes FIG. 6.

At a point (W) of the phase A, the ripple follows the stepwise waveform, but at a point (X) of the phase B, since the rise of the current is delayed, it is unable to follow the stepwise waveform. This shows that, at the point (W) of the phase A, the rotational angle can maintain the position, but the point (X) of the phase B, the rotational angle cannot maintain the position. In the micro step driving of the stepping motor, the rotational angle is controlled by the current caused to flow to the phase A and the phase B. However, at the point (P), the angle position of the phase A fluctuates, therefore it shows that the angle position of the stepping motor fluctuates. The generating of the fluctuation of the angle position shows that the vibration is generated in the stepping motor.

A driving current waveform of the phase A at a point (Q) of FIG. 11A denotes FIG. 9. A driving current waveform of the phase B at a point (Q) of FIG. 11B denotes FIG. 7.

At a point (Y) of the phase B, the ripple follows the stepwise waveform, but at a point of (Z) of the phase A, since the fall of the current is delayed, it cannot follow the stepwise waveform. This shows that, at the point (Z) of the phase A, the rotational angle can maintain the position, but the point (Y) of the phase B, the rotational angle cannot maintain the position. Due to the same reason as the fluctuation of the rotational angle at the point (P), at the point (Q) also, the angle position fluctuates and the vibration is generated in the stepping motor.

Incidentally, in Japanese Patent Application KOKAI Publication No. 9-219995, a technology is disclosed, in which the decrease in the current at the time of off during the chopping operation for the constant current to be supplied at the time of the micro step driving is performed by a combination of high speed attenuation and low speed attenuation. However, the through rate of the current at the time of the current increase and current decrease is not allowed to be variable corresponding to the magnitude of the step difference of the current stepwise waveform at the time of the micro step driving.

BRIEF SUMMARY OF THE INVENTION

The present invention has been carried out in view of the above described problems and it is an object of the present invention to provide a driving method and a driving circuit for a stepping motor, in which, similarly to a micro step driving, when there is a stepwise step difference between current waveforms, a rise through rate is changed and controlled by matching the step difference at an increase time of a value of current, and a fall through rate is changed and controlled by matching the step difference at a decrease time of the value of current and further, a through rate matched with the step difference is used at a point of change of the current and from after the current becomes a constant value, the rise/fall through rates are controlled so as to be "small", thereby obtaining a current waveform in which the ripple is reduced and follows the stepwise waveform.

In order to achieve the above described object, a method for driving a stepping motor which performs the micro step driving of the present invention comprises the steps of: making a rise through rate variable by matching a step difference related to a change in a value of current when the value of current caused to flow in the stepping motor is increased in the micro step driving; and making a fall through rate variable by matching a step difference related to a change in a value of current when the value of current caused to flow in the stepping motor is decreased in the micro step driving.

Further, there is provided a method for driving a stepping motor by a driving circuit of a stepping motor having a first transistor group which controls a rise through rate of a driving current caused to flow in the stepping motor, a second transistor group which controls a fall through rate of the driving current caused to flow in the stepping motor, and a transistor control circuit which controls ON/OFF states of the first and second transistor groups, comprising the steps of: variably controlling a rise through rate by controlling the ON/OFF states of the first transistor group by matching a step difference related to a change in a value of current by the transistor control circuit when the value of current caused to flow in the stepping motor is increased in the micro step driving; and variably controlling a fall through rate by matching the difference of a value of current by controlling the ON/OFF states of the second transistor group by matching the step difference related to the change in the value of current by the transistor control circuit when the value of current caused to flow in the stepping motor is decreased in the micro step driving.

Further, the driving circuit of the stepping motor of the present invention performs the micro step driving and comprises: a first transistor group which controls a rise through rate of a driving current caused to flow in the stepping motor; a second transistor group which controls a fall through rate of a driving current caused to flow in the stepping motor; and a transistor control circuit, in which, by controlling ON/OFF states of the first and second transistor groups, the driving current caused to flow in the stepping motor is made variable, thereby variably controlling the rise through rate and the fall through rate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a waveform chart in the case where a current waveform at a point (Z) of FIG. 1 is controlled by the rise through rate "large" and the fall through rate "large";

FIG. 6 is a waveform chart in the case where the current waveform at the point (X) of FIG. 1 is controlled by the rise through rate "small" and the fall through rate "small";

FIG. 7 is a waveform chart in the case where the current waveform at the point (Y) of FIG. 1 is controlled by the rise through rate "small" and the fall through rate "small";

FIG. 8 is a waveform chart in the case where the current waveform at the point (W) of FIG. 1 is controlled by the rise through rate "small" and the fall through rate "small";

FIG. 9 is a waveform chart in the case where the current waveform at the point (Z) of FIG. 1 is controlled by the rise through rate "small" and the fall through rate "small";

FIGS. 11A and 11B are views showing a relationship between the phase A and the phase B in the case where the relationship between the micro step driving and the drive through rate is used in the conventional rise through rate "small" and fall through rate "small";

DETAILED DESCRIPTION OF THE INVENTION

An embodiment of the present invention will be described below with reference to the drawings.

Figure 1:
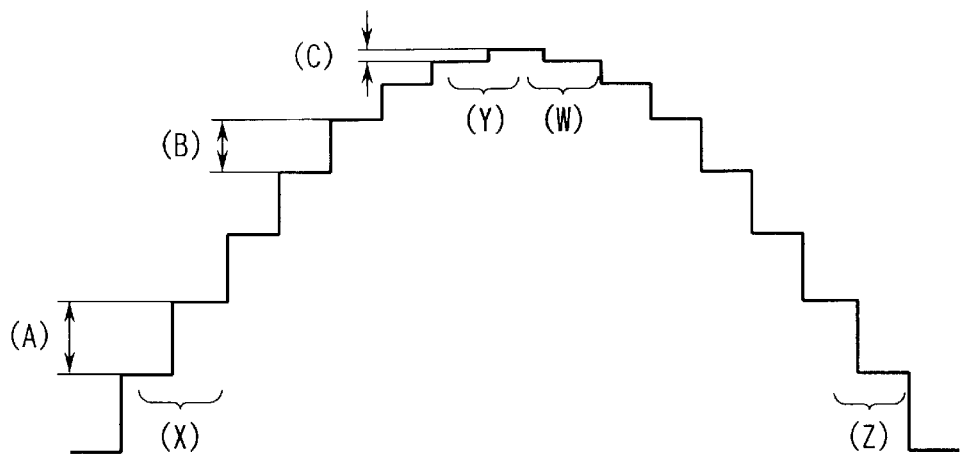
FIG. 1 is a view showing an ideal value of a phase current waveform (⅛ partition) in a micro step driving.
Figure 2:
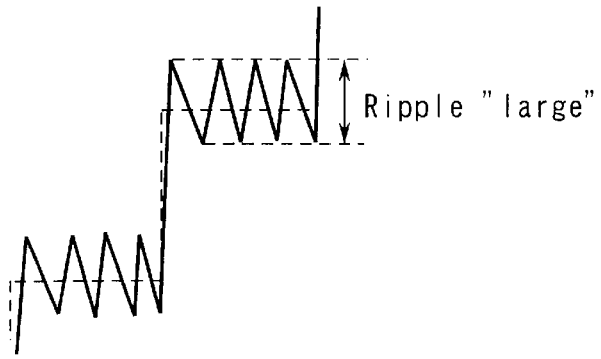
FIG. 2 is a waveform chart in the case where a current waveform at a point (X) of FIG. 1 is controlled by a rise through rate "large" and a fall through rate "large"
Figure 3:
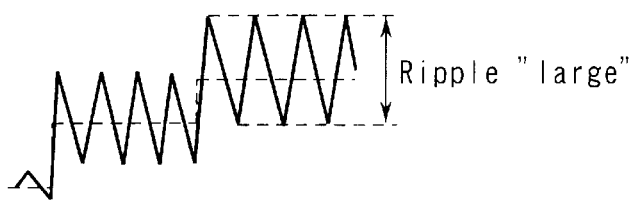
FIG. 3 is a waveform chart in the case where a current waveform at a point (Y) of FIG. 1 is controlled by the rise through rate "large" and the fall through rate "large"
Figure 4:
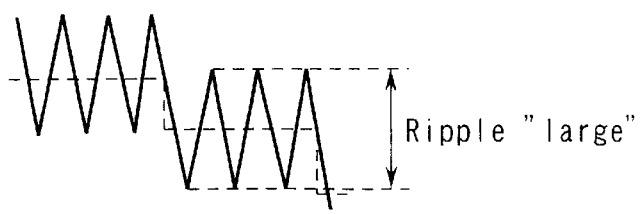
FIG. 4 is a waveform chart in the case where a current waveform at a point (W) of FIG. 1 is controlled by the rise through rate "large" and the fall through rate "large"
Figure 10A:
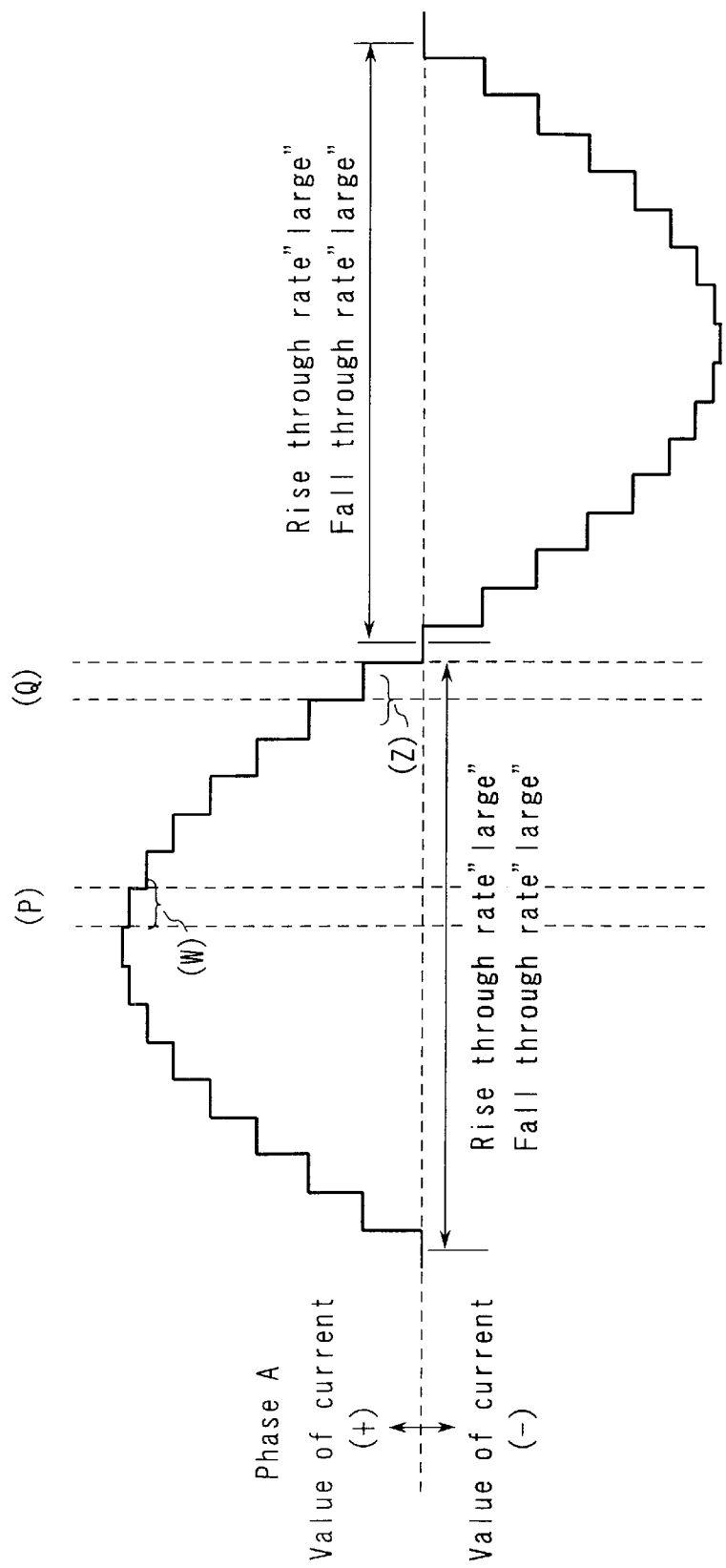
FIGS. 10A and 10B are views showing a relationship between a phase A and a phase B in the case where a relationship between a micro step driving and a drive through rate is used in a conventional rise through rate "large" and fall through rate "large"
Figure 10B:
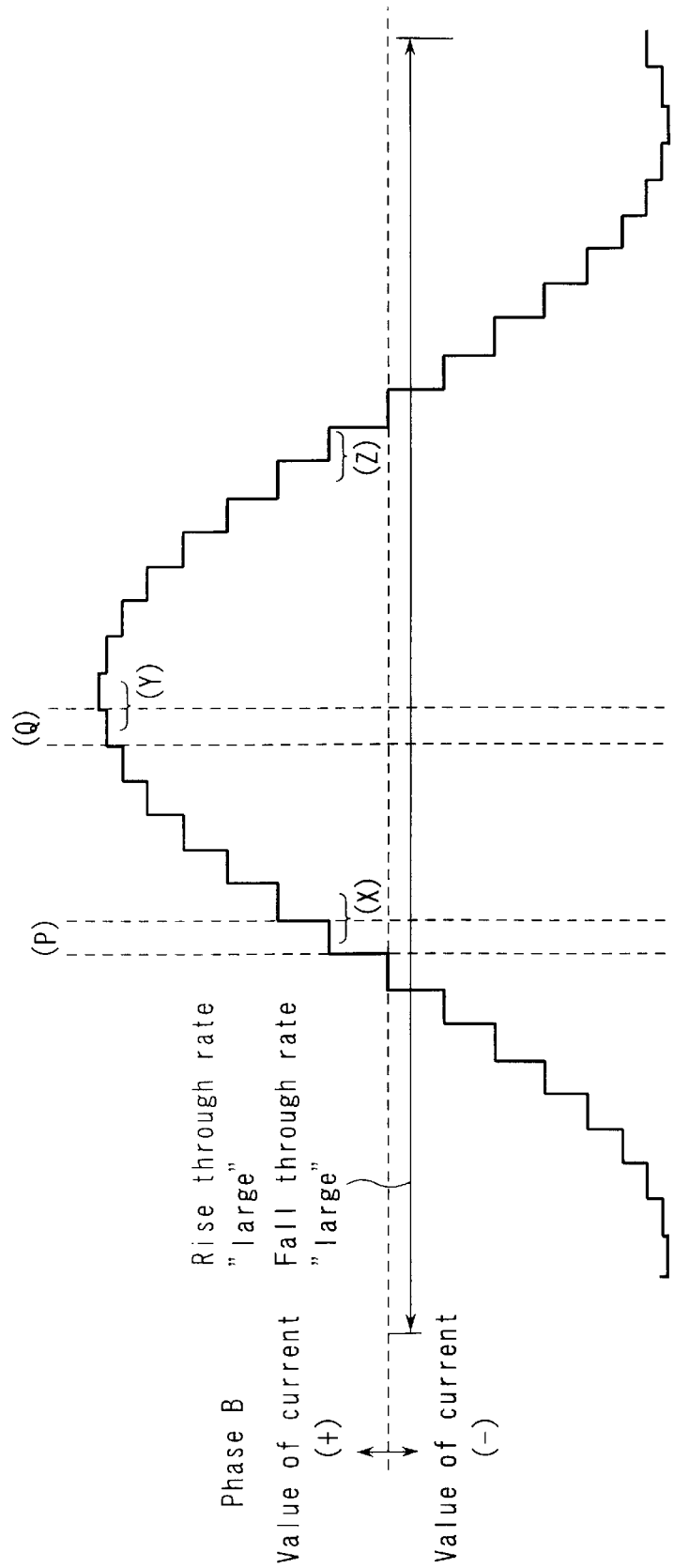
Figure 11A:
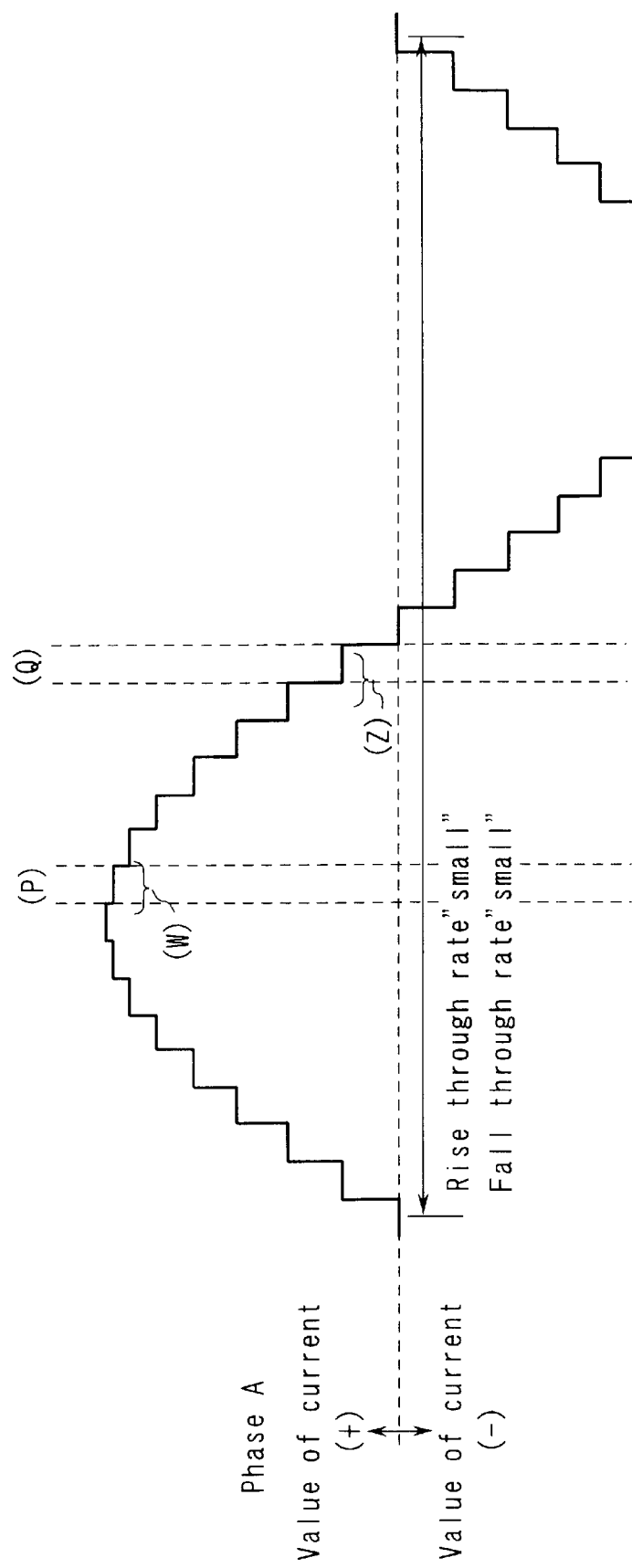

In the embodiment of the present invention, in order to realize a micro step driving shown in FIG. 1 previously, current waveforms as shown in FIGS. 12 to 15 are used.

Figure 12:
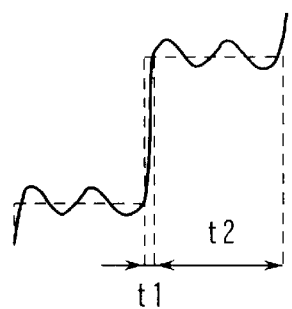
FIG. 12 is a current waveform chart at the point (X) of FIG. 1 when used in the control of the rise/fall through rates according to the present invention.

That is, FIG. 12 shows a current waveform at a point (X) of FIG. 1. In this waveform, a time t1 is controlled by a rise through rate "large", and a time t2 is controlled by a rise through rate "small". A fall through rate is controlled by "small".

Figure 13:
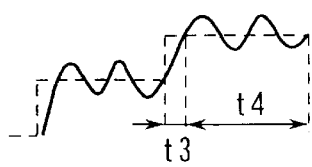
FIG. 13 is a current waveform chart at the point (Y) of FIG. 1 when used in the control of the rise/fall through rates according to the present invention.

FIG. 13 shows a current waveform at a point (Y) of FIG. 1. In this waveform, a time t3 is controlled by the rise through rate "large", and a time t4 is controlled by the rise through rate "small". The fall through rate is controlled by "small".

Figure 14:
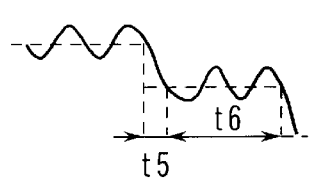
FIG. 14 is a current waveform chart at the point (W) of FIG. 1 when used in the control of the rise/fall through rates according to the present invention.

FIG. 14 shows a current waveform at a point (W) of FIG. 1. In this waveform, the rise through rate is controlled by "small". A time t5 is controlled by the fall through rate "small", and a time t6 is controlled by the fall through rate "small".

Figure 15:
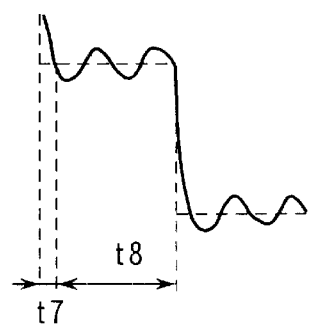
FIG. 15 is a current waveform chart at the point (Z) of FIG. 1 when used in the control of the rise/fall through rates according to the present invention.

FIG. 15 shows a current waveform at a point (Z) of FIG. 1. In this waveform, the rise through rate is controlled by "small". A time t7 is controlled by the fall through rate "large", and a time t8 is controlled by the fall through rate "small".

Figure 16A:
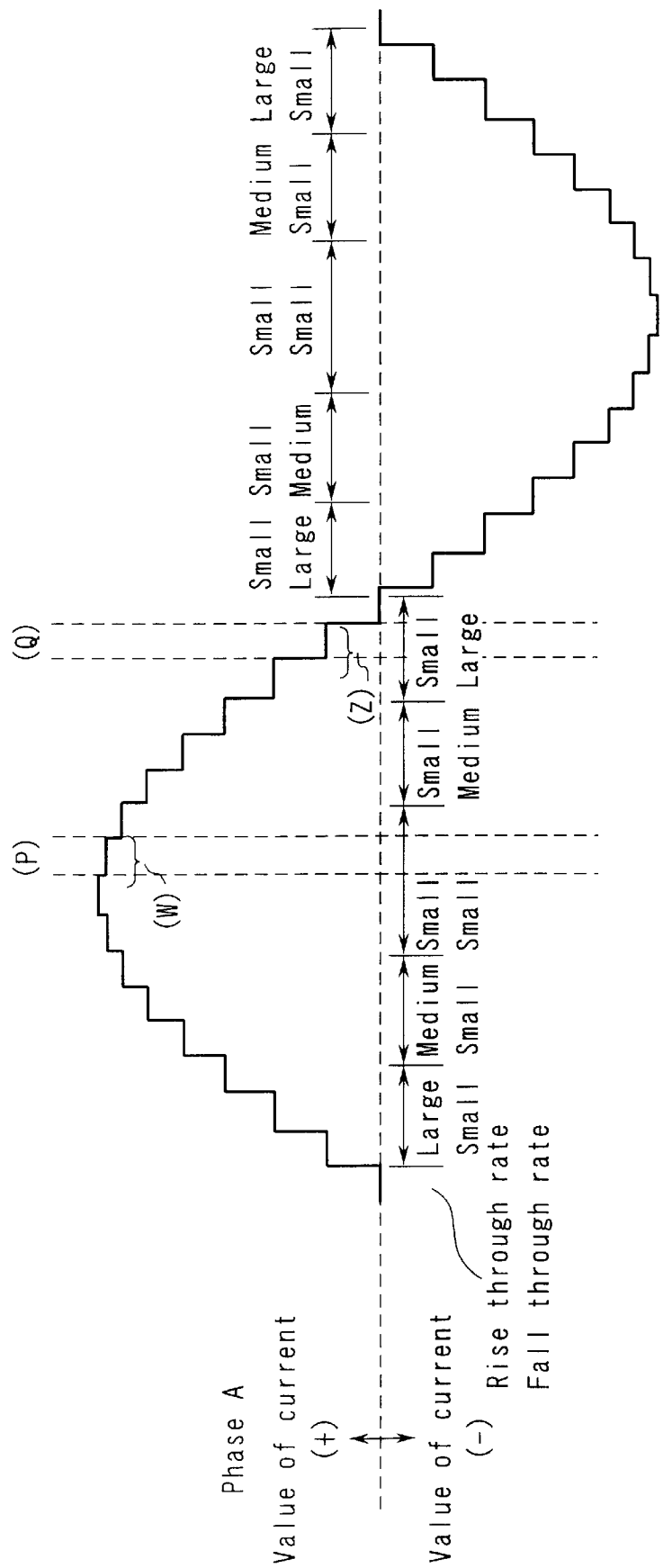
FIGS. 16A and 16B are views showing a relationship between the phase A and the phase B in the case where the relationship between the micro step driving and the drive through rate is used in the control of the rise and fall through rates according to the present invention.
Figure 16B:
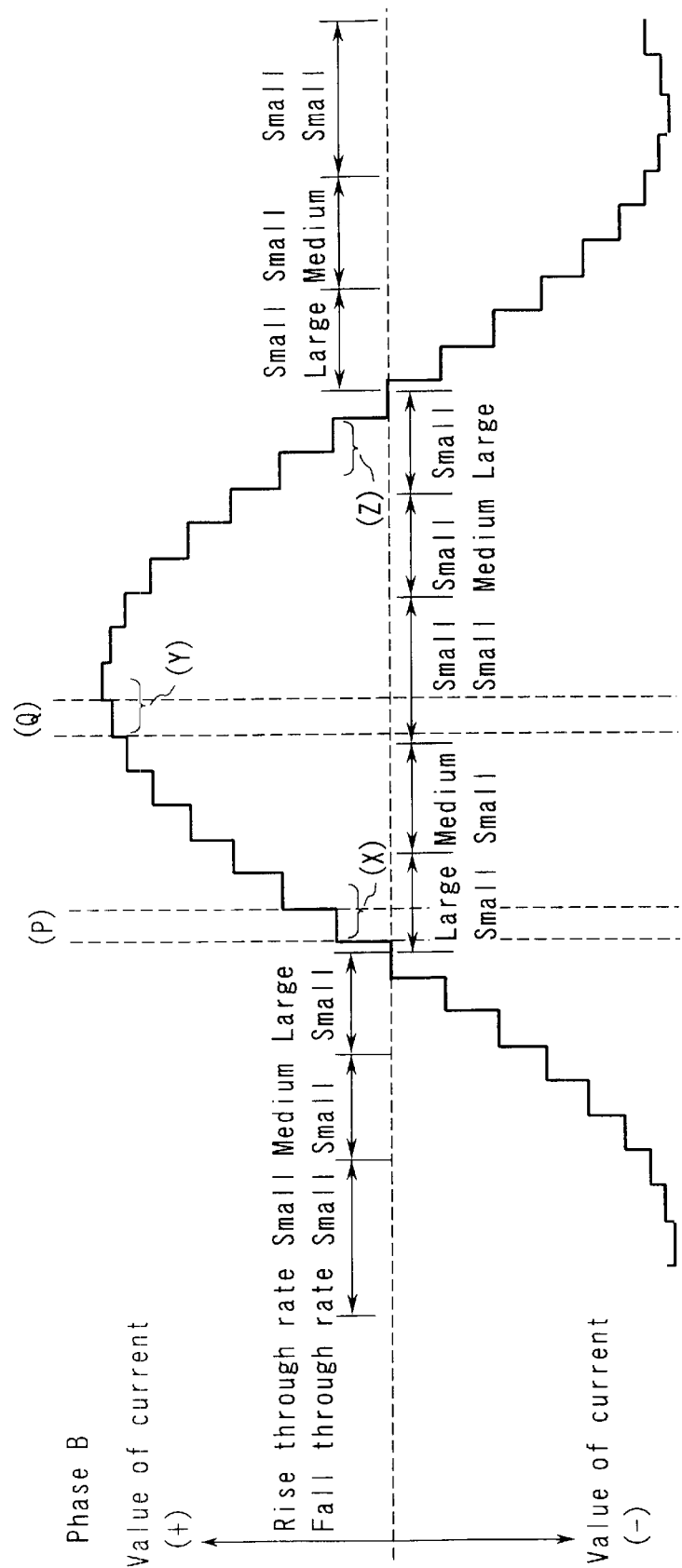

Next, in FIGS. 16A and 16B, a relationship between a micro step driving current waveform and a drive through rate according to the present invention is shown.

Here, the relationship between the controls of the rise through rate and the fall through rate is shown by comparing a phase A and a phase B.

The rise through rate is taken as "large" when the step difference at the time of increase in the whole stepwise waveforms is large, and taken as "small" when the step difference is small, and taken as "middle" when the step difference is middle between a large portion and a small portion. Also, the fall through rate is always taken as "small" at the time of increase in the whole of stepwise waveforms.

The rise through rate is taken as "large" when the step difference at the time of increase in the whole stepwise waveforms is large, and taken as "small" when the step difference is small, and taken as "middle" when the step difference is middle between a large portion and a small portion. Also, the fall through rate is always taken as "small" at the time of increase in the whole stepwise waveforms. In each step difference of the stepwise waveforms, at a point of change of the step difference, the above described usage of the rise through rate and the fall through rate is applied, and after when the point of change became a constant value, both the rise through rate and the fall through rate are made always "small".

Hereinafter, such a macro step driving will be described more in detail.

A driving current waveform of the phase A at a point (P) of FIG. 16A denotes FIG. 14. A driving current waveform of the phase B at a point (P) of FIG. 16B denotes FIG. 12.

At a point (W) of the phase A and at a point (X) of the phase B, the current ripple follows the stepwise waveform while it is "small". To be able to follow the stepwise waveform indicates that both the phase A and the phase B are in a position to follow the rotational angle. In the micro step driving of the stepping motor, since the rotational angel is controlled by the value of current caused to flow in the phase A and the phase B, it shows that the control can be made at a correct rotational angle.

A driving current waveform of the phase A at a point (Q) of FIG. 16A denotes FIG. 15. A driving current waveform of the phase B at a point (P) of FIG. 16B denotes FIG. 13.

At a point (Z) of the phase A and at a point (Y) of the phase B, the current ripple follows the stepwise waveform while it is "small". To be able to follow the stepwise waveform indicates that both the phase A and the phase B are in a position to follow the rotational angle. In the micro step driving of the stepping motor, since the rotational angel is controlled by the value of current let flow in the phase A and the phase B, it shows that the control can be made at a correct rotational angle.

Next, the motor driving circuit according to the embodiment of the present invention will be described below.

Figure 17:
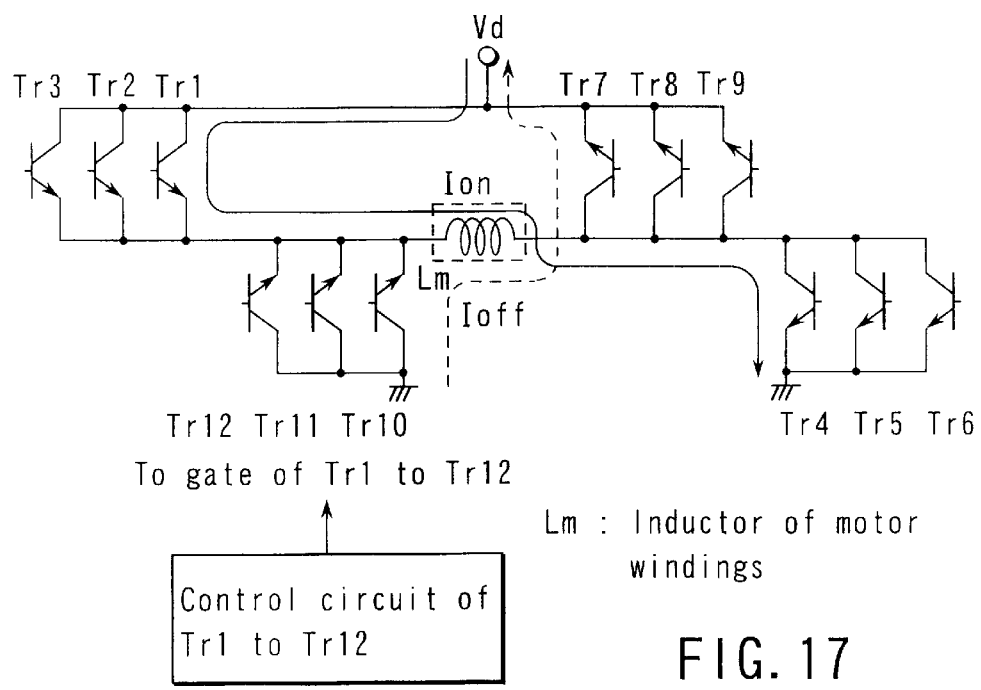
FIG. 17 is a block diagram of a motor driving circuit of the present invention by a method of changing the number of driving transistors.

In FIG. 17, the constitution of a driving circuit of a stepping motor according to the embodiment is shown, and it will be described below.

Here, a method is adapted, in which driving current to the motor is made variable by controlling ON/OFF states of a drive transistor.

As shown in this FIG. 17, this motor driving circuit is constituted by rise through rate control transistors Tr1 to Tr6, fall through rate control transistors Tr7 to Tr12, a load Lm of motor windings, and a control circuit of transistors Tr1 to Tr12.

The motor driving circuit having such a constitution operates as follows.

That is, those which decide the rise through rate for causing driving current Ion to flow into the motor are the transistors Tr1 to Tr6. When much more current is caused to flow so as to raise the rise through rate, the transistors Tr1 to Tr6 are turned ON at the same time.

When the rise through rate is made small, the number of transistors to be turned on at the same time is reduced. That is, for the rise through rate "medium", only the transistors Tr1, Tr2 and transistors Tr4, Tr5 are turned ON. For the rise through rate "small", only the transistor Tr1 and Tr4 are turned ON.

On the other hand, when the current is reduced from the motor, the current Ioff flows.

On this occasion, in order to make the fall through rate large, the transistors Tr7, Tr8, Tr9 and Tr10, Tr11, Tr12 are turned ON at the same time. In order to change the fall through rate, the number of transistors to be turned ON at the same time may be changed.

For the fall through rate "medium", the transistors Tr7, Tr8 and the transistors Tr10, Tr11 are turned ON at the same time. For the fall through rate "small", the transistors Tr7 and Tr10 are turned ON at the same time.

When the current Ion flows, transistors Tr7, Tr8, Tr10, Tr11 and Tr12 are turned OFF, and when the current Ioff flows, the transistors Tr1, Tr2, Tr3, Tr4, Tr5 and Tr6 are turned OFF.

Next, in FIG. 18, another constitutional example of the driving circuit of the stepping motor according to the embodiment is shown, and it will be described below.

Here, a method is adapted, in which driving current is made variable by making inductors and resistances variable which are applied in series to the motor.

Figure 18:
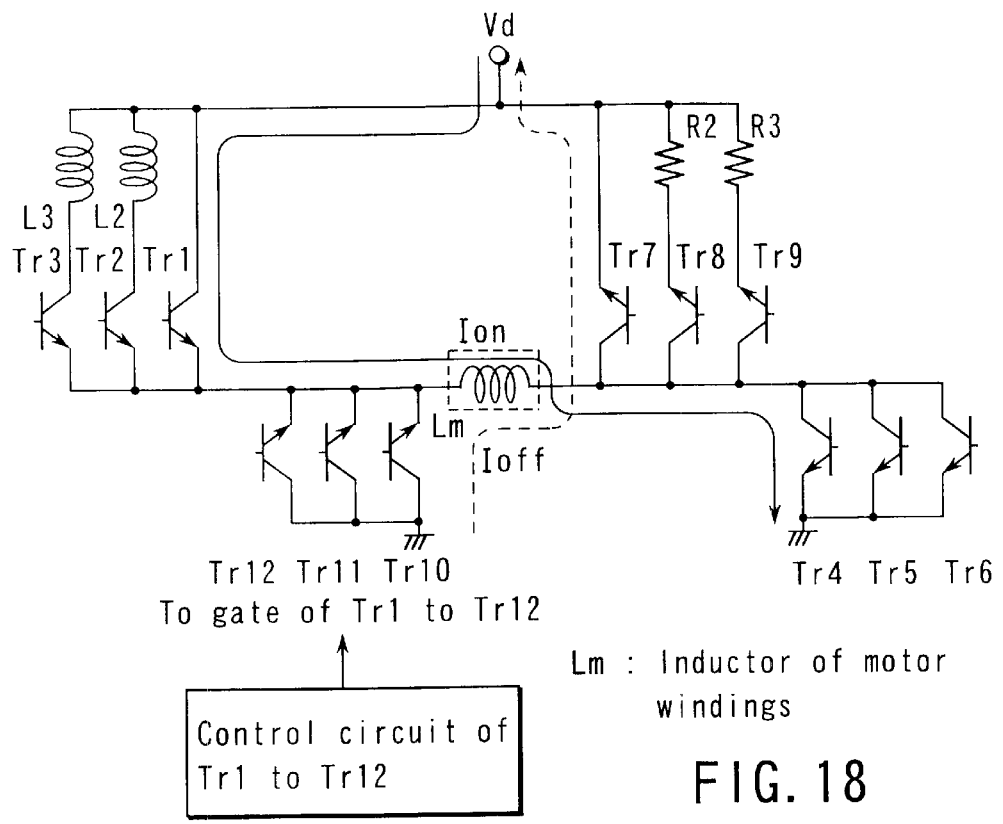
FIG. 18 is a block diagram of the motor driving circuit of the present invention by a method of changing inductors and resistors to be applied in series to a motor.

As shown in this FIG. 18, this motor driving circuit is constituted by rise through rate control transistors Tr1 to Tr6, fall through rate control transistors Tr7 to Tr12, a loads Lm of motor windings, inductors L2 and L3, resistors R8 and R9 and a transistor control circuit.

The motor driving circuit having such a constitution operates as follows.

That is, those which decide the rise through rate for causing driving current Ion to flow into the motor are the inductors L2 and L3 which are interposed in series for the load Lm of the motor windings.

That is, by a ratio of the load Lm of the motor windings and the inductors L2 and L3, a rise through rate characteristic can be changed. For example, if a value equivalent to the load Lm of the motor windings is used for the inductor L2, the rise time takes two times as much.

Here, assuming that a relationship of L2<L3 exists between the inductors L2 and L3, the L3 in which the value connected in series to the load Lm of the motor windings is large is larger in a rise time. The rise through rate becomes larger in order of the cases where the transistor Tr1 is turned ON, where the transistor Tr2 is turned ON and where the transistor Tr3 is turned ON.

Here, by adjusting the values of the inductors L2 and L3, when the rise through rate is "large", the transistor Tr1 is turned ON, and when the rise through rate is "medium", the transistor Tr2 is turned ON, and when the rise through rate is "small", the transistor Tr3 is turned ON.

When the current is decreased from the motor, the current Ioff flows.

The fall through rate changes by the values of resistors R2 and R3 connected in series. Since the resistors R2 and R3 connected in series become current limiting resistors and make it difficult for the current Ioff to flow, the fall time becomes large and the fall through rate becomes small.

Assuming that the values of these resistors R2 and R3 are such that there exists a relationship of R2<R3, the R3 in which the value connected in series for the load Lm of the windings is large is larger in the fall time. The fall through rate becomes larger in order of the cases where the transistor Tr7 is turned ON, where the transistor Tr8 is turned ON and where the transistor Tr9 is turned ON.

Here, by adjusting the values of the resistors R2 and R3, the rise through rate is adjusted. That is, when the rise through rate is "large", the transistor Tr7 is turned ON. When the rise through rate is "medium", the transistor Tr8 is turned ON. When the rise through rate is "small", the transistor Tr9 is turned ON.

Next, in FIG. 19, another constitutional example of the driving circuit of the stepping motor according to the embodiment is shown, and it will be described below. Here, a method is adopted, in which a motor drive voltage is changed.

Figure 19:
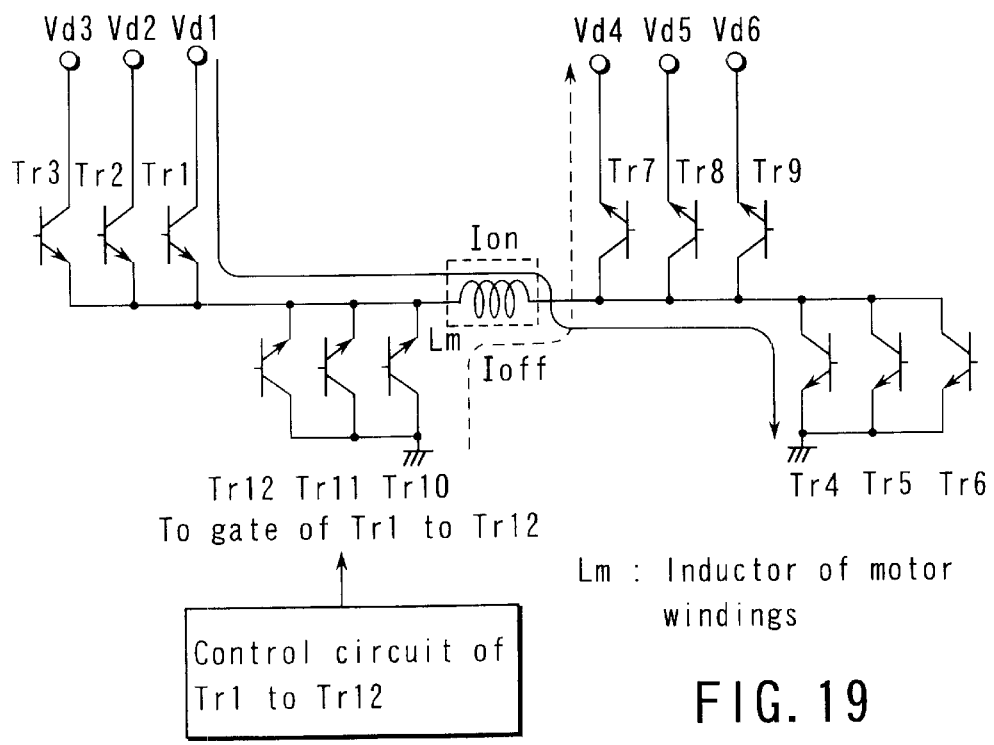
FIG. 19 is a block diagram of the motor driving circuit of the present invention by a method of changing a motor driving voltage.

As shown in this FIG. 19, this motor driving circuit is constituted by rise through rate control transistors Tr1 to Tr6, fall through rate control transistors Tr7 to Tr12, and a load Lm of motor windings. Also, a plurality of driving voltages are provided (Vd1 to Vd3).

The motor driving circuit having such a constitution operates as follows.

That is, those which decide the rise through rate for causing current Ion to flow into the motor are the motor drive voltages Vd1, Vd2 and Vd3 applied to the load Lm of the motor windings. When the voltage to be applied is large, a force to let the current flow becomes large and the rise time becomes small and the through rate becomes large.

Here, by adjusting the values of the motor drive voltages Vd1, Vd2 and Vd3 to be applied (Vd1>Vd2>Vd3), when the rise through rate is "large", the transistor Tr1 is turned ON, and when the rise through rate is "medium", the transistor Tr2 is turned ON, and when the rise through rate is "small", the transistor Tr3 is turned ON and used.

When the current is decreased from the motor, the current Ioff flows.

Those which decide the fall through rate for letting the current Ioff to flow into this motor are motor drive voltages Vd4, Vd5 and Vd6 applied to the load Lm of the motor windings. When the voltage to be applied is large, a force to let the current to flow becomes large and the fall time becomes small and the fall through rate becomes large.

Here, by adjusting the values of the motor drive voltages Vd4, Vd5 and Vd6 to be applied (Vd4>Vd5>Vd6), when the fall through rate is "large", the transistor Tr7 is turned ON. When the fall through rate is "medium", the transistor Tr8 is turned ON. When the fall through rate is "small", the transistor Tr9 is turned ON.

As described above, according to the driving method and the driving circuit for the stepping motor of the present invention, a follow-up control can be performed according to the stepwise waveforms of the current let flow in the phase A and phase B in the micro step driving of the stepping motor, and the vibration generated without being able to follow the current waveforms can be controlled.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for driving a stepping motor which performs a micro step driving, comprising the steps of:

making a rise through rate variable by matching a step difference related to a change in a value of current, wherein the rise through rate is defined as "large" when the step difference is large, wherein the rise through rate is defined as "small" when the step difference is small, and wherein the rise through rate is defined as "middle" when the step difference is between a large difference and a small difference, when the value of current caused to flow in the stepping motor is increased in the micro step driving; and making a fall through rate variable, wherein the fall through rate is defined as "large" when the step difference is large, wherein the fall through rate is defined as "small" when the step difference is small, and wherein the fall through rate is defined as "middle" when the step difference is between a large difference and a small difference, when the value of current caused to flow in the stepping motor is decreased in the micro step driving.

2. The method for driving a stepping motor according to claim 1, further comprising the step of:

setting the rise through rate and the fall through rate by matching the step difference related to a change in the value of current at a point of change of increase/decrease of the value of current caused to flow in the stepping motor in the micro step driving.

3. The method for driving a stepping motor according to claim 1, further comprising the step of:

making the rise through rate and the fall through rate small when the value of current caused to flow in the stepping motor becomes a constant value in the micro step driving.

4. A method for driving a stepping motor by a driving circuit of a stepping motor having a first transistor group which controls a rise through rate of a driving current caused to flow in the stepping motor, a second transistor group which controls a fall through rate of the driving current caused to flow in the stepping motor, and a transistor control circuit which controls ON/OFF states of the first and second transistor groups, comprising the steps of:

variably controlling a rise through rate by controlling the ON/OFF states of the first transistor group by matching a step difference related to a change in a value of current by the transistor control circuit when the value of current caused to flow in the stepping motor is increased in the micro step driving; and variably controlling a fall through rate by matching the difference of a value of current by controlling the ON/OFF states of the second transistor group by matching the step difference related to the change in the value of current by the transistor control circuit when the value of current caused to flow in the stepping motor is decreased in the micro step driving.

5. The method for driving a stepping motor according to claim 4, further comprising the step of:

setting the rise through rate and the fall through rate by controlling the ON/OFF states of the first and second transistor groups by the transistor control circuit so as to match with the step difference related to the change in the value of current at the point of the change of increase/decrease of the value of current caused to flow in the stepping motor in the micro step driving.

6. The method for driving a stepping motor according to claim 4, further comprising the step of:

making the rise through rate and the fall through rate by controlling the ON/OFF states of the first and second transistor groups by the transistor control circuit when the value of current caused flow in the stepping motor becomes a constant value in the micro step driving.

7. A driving circuit of a stepping motor which performs a micro step driving, comprising:

a first transistor group which controls a rise through rate of a driving current caused to flow in the stepping motor;

a second transistor group which controls a fall through rate of a driving current caused to flow in the stepping motor; and a transistor control circuit, in which, by controlling ON/OFF states of the first and second transistor groups, the driving current caused to flow in the stepping motor is made variable, thereby variably controlling the rise through rate and the fall through rate.

8. The driving circuit of a stepping motor according to claim 7, wherein a collector of at least a part of the transistors which constitute the first transistor group is connected to a driving power source and an emitter is grounded through an inductor of motor windings, and wherein the emitter of at least a part of the transistors which constitute the second transistor group is connected to the driving power source and the collector is grounded through the inductor of the motor windings.

9. The driving circuit of a stepping motor according to claim 7, wherein the collector of at least a part of the transistors which constitute the first transistor group is connected to the driving power source through a different inductor and the emitter is grounded through the inductor of the motor windings, and the emitter of at least a part of the transistors which constitute the second transistor group is connected to the driving power source through a different resistor and the collector is grounded through the inductor of the motor windings.

10. The driving circuit of a stepping motor according to claim 9, wherein the rise through rate is decided by a value of the different inductor connected in series to the inductor of the motor winding.

11. The driving circuit of a stepping motor according to claim 9, wherein the fall through rate is decided by a resistance value of a resistor connected to at least a part of the transistors which constitute the second transistor group.

12. The driving circuit of a stepping motor according to claim 7, wherein the collector of each transistor which constitutes the first transistor group is connected to a driving power source having different voltage and the emitter is grounded through the inductor of the motor windings.

13. The driving circuit of a stepping motor according to claim 7, wherein an output of the transistor control circuit is connected to a base of each transistor which constitutes the first and second transistor groups.

14. The driving circuit of a stepping motor according to claim 7, wherein the transistor control circuit decides the rise through rate by turning ON at least a part of the transistors which constitute the first transistor group and decides the fall through rate by turning ON at least a part of transistors which constitute the second transistor group.

* * * * *